United States Patent Office 3,224,838
Patented Dec. 21, 1965

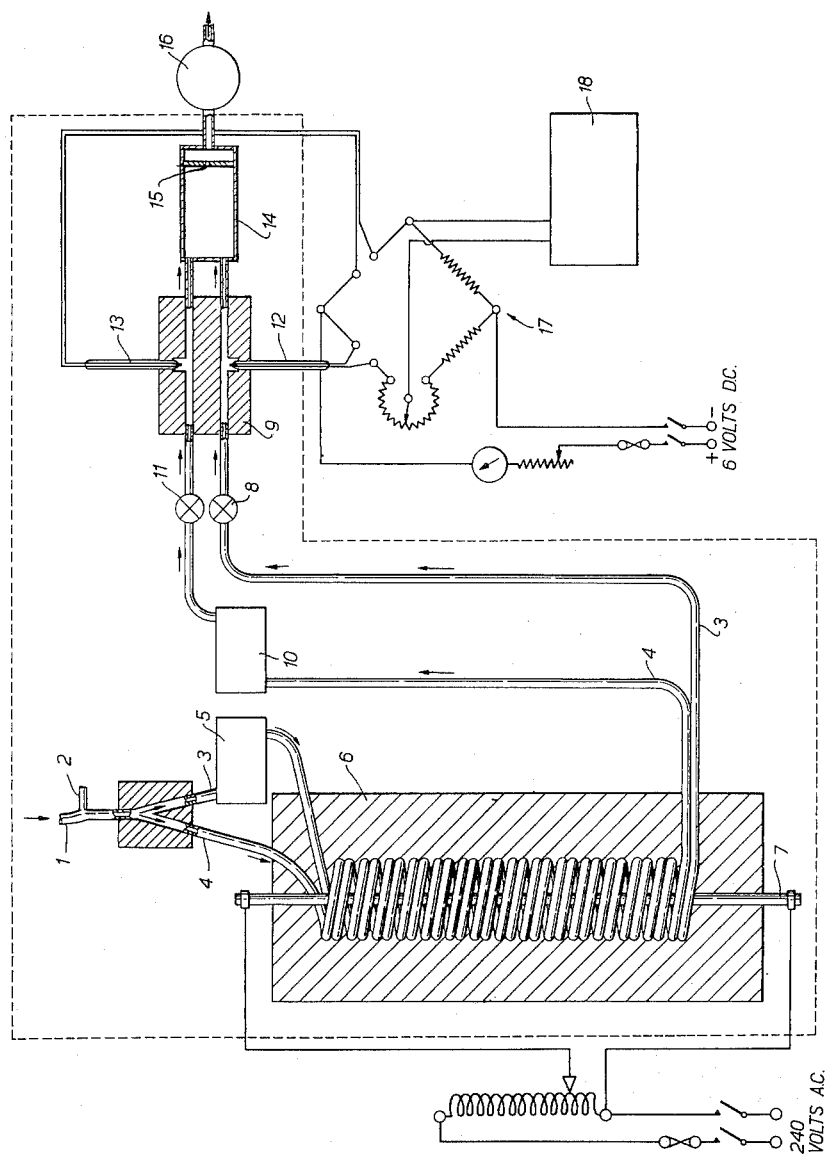

3,224,838
GAS TESTING
Norman Evans and John Ronald Wiles, Sunbury-on-Thames, England, assignors to The British Petroleum Company Limited, London, England, a British joint-stock corporation
Filed Nov. 20, 1962, Ser. No. 239,000
Claims priority, application Great Britain, Dec. 5, 1961, 43,485/61
8 Claims. (Cl. 23—232)

This invention relates to a method and apparatus for determining the solid carbon content of gases and, in particular, of flue gases.

Most solid particles emitted from the flues of industrial installations contain carbon to a greater or lesser extent. The amount may vary from soot which is substantially completely carbon to fly-ash which contains relatively little. The emission of carbon in flue gases in whatever form is undesirable since any unburnt carbon represents a loss of heat which, in the case of large installations, can be considerable. Moreover, any solid particles emitted from such installations fall in the immediate neighbourhood and can be a considerable nuisance and, possibly, a health hazard. An increasing number of authorities are introducing regulations to restrict the permissible solid particle content of flue gases and it is desirable, therefore, to monitor this quantity easily and continuously.

According to the present invention a method for determining the solid carbon content of gases comprises continuously taking a sample of the gas, splitting it into two streams, treating one stream to remove solid particles, subjecting each stream to combustion conditions and comparing the thermal conductivities of the streams.

The above method is particularly suitable for testing flue gases. The one stream is preferably filtered to remove solid particles and this stream is then used as a continuous standard reference for comparison. The flue gas streams are subjected to combustion conditions in order to convert any carbonaceous material to carbon dioxide. The flue gas may already contain sufficient oxygen for this combustion to take place but if not, additional oxygen or air may be introduced into the sample. Combustion is carried out at a temperature of at least 850° C. and preferably in the region of 1000° C. Any increase in the carbon dioxide content of the unfiltered stream due to the combustion of solid carbon will be detected during the comparison of thermal conductivities. Any increase in carbon dioxide content due to the combustion of any non-solid material, for example, carbon monoxide, will be common to both streams and the effect on the thermal conductivities will be cancelled out during the comparison.

The invention includes apparatus for determining the solid carbon content of gases, particularly flue gases, comprising a sample line split into two branches, means for removing solid particles from one of the branches, means for subjecting material in each branch to combustion conditions and means for comparing the thermal conductivity of the materials in the branches.

The means for removing solid particles from the one branch may conveniently comprise a filter, for example a glass-wool filter. The combustion means may comprise a furnace, preferably electrically heated. The thermal conductivities may be detected by suitable devices, for example thermistors or by the hot-wire technique, and the output from these devices may be fed to a suitable comparator and recorder, which may be calibrated in weight of carbon per unit volume of gas. Conveniently, thermistors, if used, may be connected to two adjacent arms of a bridge circuit, the bridge output being fed to the recorder. Preferably the temperature of the thermistors is maintained at the lowest possible temperature above the dew point of the gas, for example in the region of 150° C. Preferably the unfiltered branch contains a diffuser to compensate for the effect of the filter in the other branch on the front shape changes in gas composition as they pass through the instrument. The gas flow rate may be independently set in each branch by the adjustment of two control valves, one in each branch before the detector to ensure dynamic balance of the system.

The invention is illustrated with reference to the accompanying drawing which is a schematic representation of the apparatus of the present invention.

In the drawing, a sample line 1 leads from a flue and is joined by air line 2 before splitting into branches 3 and 4. Branch 3 passes through a filter 5 and then, together with branch 4, passes through furnace box and passes via control valve 8 to detector 9. Branch 4 passes from the furnace, through correcting diffuser 10 and control valve 11 into detector 9. Thermistors 12 and 13 are positioned within the detector to project into branches 3 and 4, respectively. Branches 3 and 4 emerge from the detector and merge within manifold 14 containing critical orifice 15. The merged branches then pass to exhaust via vacuum pump 16. Thermistors 12 and 13 form adjacent arms of bridge circuit 17, the output from which is fed to recorder 18.

A sample of flue gas is drawn into sample line 1 by means of vacuum pump 16 and is mixed with air introduced from line 2, the air-flue gas mixture then splitting along branches 3 and 4. The working (i.e. unfiltered) stream passes along branch 4 directly into electrically heated furnace 6 which is maintained at a temperature sufficient to ensure that all carbon particles are oxidised to $CO_2$. Branch 4 passes out of the furnace and is cooled to a temperature above the acid and water dew points before passing through a correcting diffuser 10 and control valve 11 to thermal conductivity detector 9. The reference stream passes along branch 3 through filter 5 to furnace 6 and is then cooled to the same temperature as the working stream, before passing via control valve 8 to thermal conductivity detector 9. Correcting diffuser 10 is identical to the filter 5 and ensures that the shape of the gas concentration front corresponding to any change in $CO_2$ content of the flue gas is the same in both the reference and working streams. Control valves 8 and 11 enable the system to be dynamically balanced. Having passed through detector 9 the branches merge in manifold 14 containing critical orifice 15, the purpose of which is to ensure a constant sample gas flow rate.

The increase in $CO_2$ level in the working stream caused by the combustion of carbon particles is detected as a change in thermal conductivity by themistor 13, the output of which is compared with that of thermistor 12 in bridge circuit 17, the bridge output being fed to recorder 18 which is calibrated in grams of carbon per litre of flue gas.

The instrument illustrated in the drawing may be calibrated as follows:

An increase in $CO_2$ content of the working stream of 0.01% of the total flue gas volume results in an output signal of 0.015 mv.

The density of $CO_2$ at STP is 1.977 grams per litre. At the normal operating conditions of 150° C. and atmospheric pressure the density of $CO_2$ is $$\frac{273 \times 1.977}{150 + 273} = 1.276 \text{ grams per litre}$$

Considering a 1 litre sample of flue gas, the instrument will give a signal of 0.015 mv. for a $CO_2$ content, due to burnt carbon of $$\frac{0.01 \times 1}{100} = 0.0001 \text{ litres}$$

The instrument signal of 0.015 mv. is therefore equivalent to a weight of $CO_2$ of 0.0001276 grams per litre and this corresponds to a weight of carbon in the flue gas of $$\frac{12}{44} \times 0.0001276 = 0.000035$$

grams per litre.

We claim:

1. A method for determining the solid carbon content of gases comprising continously sampling the gas, splitting the sample into two streams, treating one stream to remove solid particles, subjecting each stream in the presence of an oxidizing medium selected from the group consisting of air and oxygen to combustion conditions by raising the temperature of each stream to a combustion temperature level at which any carbonaceous material in each stream is oxidized to carbon dioxide, and thereafter measuring and comparing the thermal conductivities of each stream.

2. A method as claimed in claim 1 including the step of cooling each stream, after combustion takes place, to the lowest possible temperature above the acid and water dew points of the stream, and thereafter measuring and comparing the thermal conductivities of each stream.

3. A method in accordance with claim 1 wherein the oxidizing medium is added as required and the combustion temperature level is at least 850° C.

4. A method as claimed in claim 3 wherein the temperature is raised to a level of the order of 1000° C.

5. An apparatus for determining the solid carbon content of gases, comprising a sample line split into two branches for continuously withdrawing a sample from a gas whose solid carbon content is to be determined and for splitting said sample into two streams, one in each of said branches; means operatively connected with one of said branches for removing solid particles from the gas stream in said one branch thereby to provide a reference gas stream in said one branch for comparison with a working gas stream in the other of said branches; combustion means for subjecting the gas stream in each branch to combustion conditions, said combustion means comprising a heater for raising the temperature of said reference and working gas streams to a combustion temperature level at which any carbonaceous material in each stream will be oxidized to carbon dioxide; and, means for measuring and comparing the thermal conductivities of the combusted reference and working gas streams.

6. An apparatus as claimed in claim 5 wherein the combustion means comprises a line for the introduction of an oxidizing medium selected from the group consisting of oxygen and air into the sample line, and an electrically heated furnace.

7. An apparatus as claimed in claim 5 wherein the means for comparing the thermal conductivities comprises a thermistor bridge circuit.

8. An apparatus as claimed in claim 5 wherein the means for removing solid particles from the gas stream in said one branch comprises a filter and wherein the unfiltered branch contains a diffuser for diffusing the combusted working gas stream to compensate for the effect of the filter in the other branch and ensure that any front shape changes in gas composition occurring in the reference gas stream will also take place in the unfiltered stream.

References Cited by the Examiner

UNITED STATES PATENTS

| 2,042,646 | 6/1936 | Willenborg | 23—232 |
| 2,486,622 | 11/1949 | White. | |
| 3,076,697 | 2/1963 | Miller et al. | 23—232 |

FOREIGN PATENTS

| 283,677 | 4/1915 | Germany. |

MORRIS O. WOLK, *Primary Examiner.*

DELBERT E. GANTZ, *Examiner.*